(12) United States Patent
Lubischer et al.

(10) Patent No.: US 9,944,307 B2
(45) Date of Patent: Apr. 17, 2018

(54) STEERING ASSEMBLY AND METHOD OF MONITORING A SPACE WITHIN VEHICLE

(71) Applicant: Steering Solutions IP Holding Corporation, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 131 days.

(21) Appl. No.: 15/044,576

(22) Filed: Feb. 16, 2016

(65) Prior Publication Data

US 2016/0375925 A1 Dec. 29, 2016

Related U.S. Application Data

(60) Provisional application No. 62/185,121, filed on Jun. 26, 2015.

(51) Int. Cl.
| | |
|---|---|
| *B62D 1/183* | (2006.01) |
| *B62D 6/00* | (2006.01) |
| *B60Q 5/00* | (2006.01) |

(52) U.S. Cl.
CPC ........... *B62D 1/183* (2013.01); *B62D 6/00* (2013.01); *B60Q 5/005* (2013.01); *B60W 2540/26* (2013.01)

(58) Field of Classification Search
CPC .......... B62D 6/00; B62D 1/183; B60Q 5/005; B60W 2540/26
See application file for complete search history.

(56) References Cited

U.S. PATENT DOCUMENTS

| | | | |
|---|---|---|---|
| 4,337,967 A | 7/1982 | Yoshida et al. | |
| 4,503,504 A | 3/1985 | Suzumura et al. | |
| 4,967,618 A | 11/1990 | Matsumoto et al. | |
| 5,295,712 A | 3/1994 | Omura | |
| 5,319,803 A | 6/1994 | Allen | |
| 5,618,058 A | 4/1997 | Byon | |
| 5,690,362 A | 11/1997 | Peitsmeier et al. | |
| 5,893,580 A | 4/1999 | Hoagland et al. | |
| 5,911,789 A | 6/1999 | Keipert et al. | |
| 6,170,862 B1 | 1/2001 | Hoagland et al. | |
| 6,227,571 B1 | 5/2001 | Sheng et al. | |
| 6,373,472 B1 | 4/2002 | Palalau et al. | |
| 6,390,505 B1 | 5/2002 | Wilson | |
| 6,819,990 B2 | 11/2004 | Ichinose | |
| 7,048,305 B2 | 5/2006 | Muller | |
| 7,062,365 B1 | 6/2006 | Fei | |
| 7,295,904 B2 | 11/2007 | Kanevsky et al. | |
| 7,461,863 B2 | 12/2008 | Muller | |
| 7,735,405 B2 | 6/2010 | Parks | |

(Continued)

*Primary Examiner* — Russell Frejd
(74) *Attorney, Agent, or Firm* — Cantor Colburn LLP

(57) ABSTRACT

A steering assembly includes a steering wheel, a steering gear, and a sensor assembly. The steering wheel is connected to a steering column. The steering gear is selectively coupled to the steering wheel. The sensor assembly is disposed proximate the steering column. The steering wheel is decoupled from the steering gear and sensor assembly detects a condition of the driver and a position of the driver in response to a request to activate an autonomous driving assisted steering system.

20 Claims, 2 Drawing Sheets

(56) References Cited

U.S. PATENT DOCUMENTS

| | | |
|---|---|---|
| 7,793,980 B2 | 9/2010 | Fong |
| 7,862,079 B2 | 1/2011 | Fukawatase et al. |
| 7,894,951 B2 | 2/2011 | Norris et al. |
| 8,002,075 B2 | 8/2011 | Markfort |
| 8,079,312 B2 | 12/2011 | Long |
| 8,146,945 B2 | 4/2012 | Born et al. |
| 8,260,482 B1 | 9/2012 | Szybalski et al. |
| 8,352,110 B1 | 1/2013 | Szybalski et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,899,623 B2 | 12/2014 | Stadler et al. |
| 8,909,428 B1 | 12/2014 | Lombrozo |
| 8,948,993 B2 | 2/2015 | Schulman et al. |
| 8,994,521 B2 | 3/2015 | Gazit |
| 9,002,563 B2 | 4/2015 | Green et al. |
| 9,031,729 B2 | 5/2015 | Lathrop et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,333,983 B2 | 5/2016 | Lathrop et al. |
| 9,360,865 B2 | 6/2016 | Yopp |
| 9,852,752 B1 | 12/2017 | Cullinane et al. |
| 2003/0227159 A1 | 12/2003 | Muller |
| 2006/0244251 A1 | 11/2006 | Muller |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2010/0222976 A1 | 9/2010 | Haug |
| 2010/0228417 A1 | 9/2010 | Lee et al. |
| 2010/0288567 A1 | 11/2010 | Bonne |
| 2012/0136540 A1 | 5/2012 | Miller |
| 2013/0325202 A1 | 12/2013 | Howard et al. |
| 2014/0111324 A1 | 4/2014 | Lisseman et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0032322 A1 | 1/2015 | Wimmer |
| 2015/0051780 A1 | 2/2015 | Hahne |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0347347 A1 | 12/2016 | Lubischer |
| 2016/0347348 A1* | 12/2016 | Lubischer .............. B62D 1/181 |
| 2016/0362126 A1* | 12/2016 | Lubischer .............. B62D 1/183 |
| 2016/0368522 A1* | 12/2016 | Lubischer .............. B62D 1/181 |
| 2016/0375770 A1* | 12/2016 | Ryne ....................... B60K 35/00 701/23 |
| 2016/0375860 A1* | 12/2016 | Lubischer .............. B60R 21/203 74/493 |
| 2016/0375923 A1* | 12/2016 | Schulz ..................... B62D 1/02 74/493 |
| 2016/0375924 A1* | 12/2016 | Bodtker .................. B62D 1/046 74/552 |
| 2016/0375926 A1* | 12/2016 | Lubischer .............. B62D 1/183 74/493 |
| 2016/0375927 A1* | 12/2016 | Schulz ................... B62D 1/183 280/775 |
| 2016/0375928 A1* | 12/2016 | Magnus ............. F16H 25/2204 74/493 |
| 2016/0375931 A1 | 12/2016 | Lubischer |
| 2017/0029009 A1* | 2/2017 | Rouleau ................. B62D 1/181 |
| 2017/0029018 A1 | 2/2017 | Lubischer |

* cited by examiner

STEERING ASSEMBLY AND METHOD OF MONITORING A SPACE WITHIN VEHICLE

CROSS-REFERENCES TO RELATED APPLICATIONS

This patent application claims priority to U.S. Provisional Patent Application Ser. No. 62/185,121, filed Jun. 26, 2015, which is incorporated herein by reference in its entirety.

BACKGROUND

The present invention generally relates to a steering assembly and a method of monitoring a space within a vehicle.

Autonomous driving assisted steering systems are being developed that are configured to steer a vehicle in certain circumstances. Responsibility to steer the vehicle may be transferred from the autonomous driving assisted steering system to the driver of the vehicle.

SUMMARY

According to an embodiment of the present invention, a steering assembly is provided. The steering assembly includes a steering wheel, a steering gear, and a sensor assembly. The steering wheel is connected to a steering column. The steering gear is selectively coupled to the steering wheel. The sensor assembly is disposed proximate the steering column. The steering wheel is decoupled from the steering gear and the sensor assembly detects a condition of the driver and a position of the driver in response to a request to activate an autonomous driving assisted steering system.

According to another embodiment of the present invention, a steering assembly is provided. The steering assembly includes a steering wheel and a sensor assembly. The steering wheel is connected to a steering column that is provided with an autonomous vehicle. The steering wheel is selectively coupled to a steering gear. The steering wheel is movable between an extended position and a retracted position. The sensor assembly is disposed proximate the steering column and includes a first sensor that provides a first signal indicative of a condition of the driver.

According to yet another embodiment of the present invention, a method of monitoring a space within an autonomous vehicle is provided. The method activates an autonomous driving assisted steering system. The method detects a condition of the driver of a vehicle with a sensor assembly while the autonomous driving assisted steering system is active. The sensor assembly provides a first signal indicative of the condition of the driver. The method provides a first warning to the driver and the first signal indicates a nonresponsive driver.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
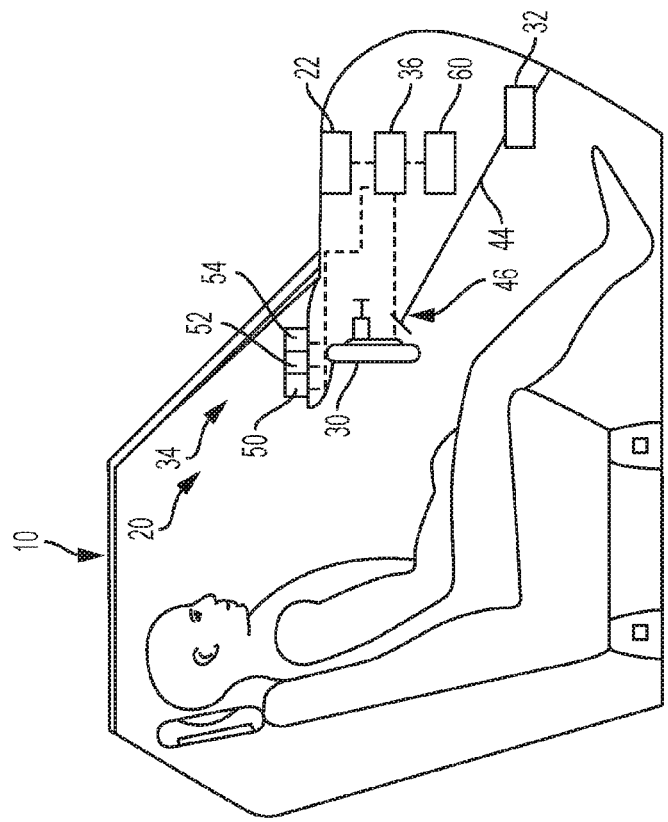
FIG. 1 a side view of a vehicle compartment having a steering assembly in a deployed position.
Figure 2:
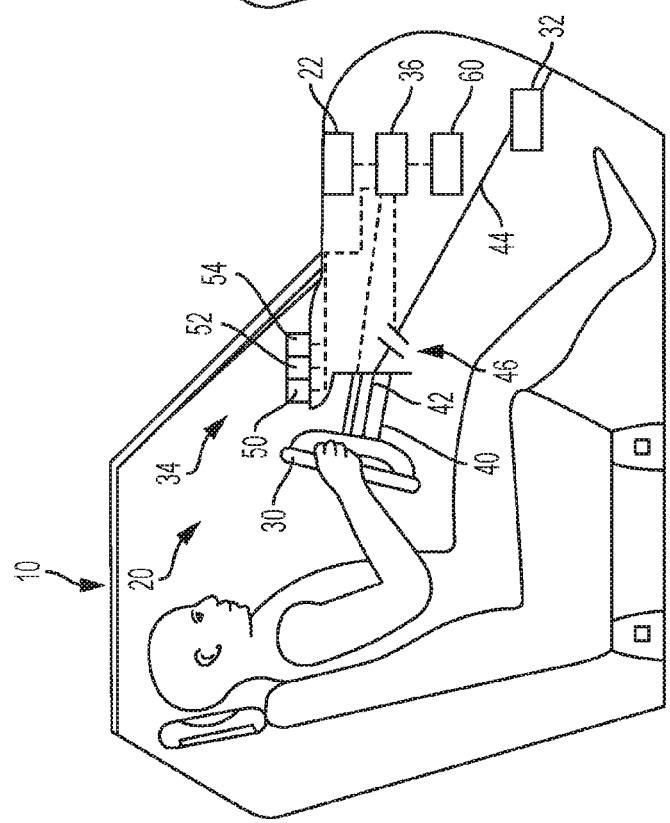
FIG. 2 is a side view of the vehicle compartment having the steering assembly in a retracted position.

Referring to FIGS. 1 and 2, a side view of a space within a vehicle, an autonomous vehicle, an autonomously driven vehicle, or a selectively autonomous vehicle such as a vehicle compartment 10 is shown. The vehicle is provided with a steering assembly 20 and an autonomous driving assisted steering system (ADAS) 22 such that the vehicle is able to perform operations without continuous input from a driver (e.g. steering, accelerating, braking, maneuvering, etc.). The ADAS 22 allows the vehicle to be at least partially autonomously controlled using sensing, steering, and/or braking technology. A driver of the vehicle is able to selectively activate or deactivate the ADAS 22 via a switch or other mechanism. A vehicle control or monitoring system is able to selectively activate or deactivate the ADAS 22 in response to events occurring within or external to the vehicle.

The steering assembly 20 includes a steering wheel 30, a steering gear 32, a sensor assembly 34, and a controller 36. The steering wheel 30 is connected to a steering column 40. The combination of the steering wheel 30 and the steering column 40 are adjustable such that the combination is extendable or retractable along a longitudinal axis 42 that extends through the steering column 40. The combination of the steering wheel 30 and the steering column 40 are tiltable relative to the longitudinal axis 42.

The steering wheel 30 is directly or indirectly selectively coupled to a steering shaft 44 connected to the steering gear 32. The steering wheel 30 is directly or indirectly selectively coupled to the steering shaft 44 by a coupling mechanism 46. The coupling mechanism 46 may include a disconnect clutch. The steering wheel 30 is coupled to the steering shaft 44 when the disconnect clutch of the coupling mechanism 46 is at least partially engaged and the ADAS 22 is deactivated. The steering wheel 30 is decoupled from the steering shaft 44 when the disconnect clutch of the coupling mechanism 46 is disengaged and the ADAS 22 is activated.

The rotation of the steering shaft 44 results in rotation or actuation of the steering gear 32 that pivots at least one vehicle wheel to steer or turn the vehicle. The steering shaft 44 is rotated by the ADAS 22 or a driver input provided to the steering wheel 30.

In at least one embodiment, the coupling mechanism 46 is configured as a component of a steer by wire system that electrically couples the steering wheel 30 to the steering shaft 44 connected to the steering gear 32. The coupling mechanism 46 includes a device, such as a rotary encoder, that interprets rotation of the steering wheel 30 and applies the information to an actuator that rotates the steering shaft 44 that pivots at least one vehicle wheel. The device provides a signal to the actuator when the ADAS 22 is deactivated. The device does not provide a signal or the signal is ignored by the actuator when the ADAS 22 is activated.

The steering wheel 30 is switchable between a rotatable condition and a non-rotating condition. The steering wheel 30 is in a rotatable condition when the ADAS 22 is deactivated. The driver of the vehicle is able to provide directional control of the vehicle through the steering wheel 30 when the ADAS 22 is deactivated. The steering wheel 30 is in a non-rotating condition when the ADAS 22 is activated. The steering wheel 30 is inhibited from rotating in the non-rotating condition. The steering wheel 30 is in the non-rotating condition when the steering wheel 30 is operatively decoupled from the steering shaft 44. In at least one embodiment, when the ADAS 22 is activated, the steering shaft 44 counter rotates such that no rotation of the steering wheel 30 is caused by the performance of steering maneuvers controlled by the ADAS 22. It is to be appreciated that "decoupling" the steering wheel 30 from the steering shaft 44 may be done mechanically, electrically, or a combination thereof.

The steering wheel 30 and the steering column 40 are movable between an extended position and a retracted position. The extended position corresponds to a position in which a driver of the vehicle is able to provide steering input via the steering wheel 30. The retracted position corresponds to a position in which the driver of the vehicle is not required to provide steering input via the steering wheel 30.

The selective activation of the ADAS 22 results in the steering wheel 30 becoming operatively decoupled from the steering shaft 44 and the steering gear 32. The steering wheel 30 switches from a rotatable condition to a non-rotatable condition, in response to the operative decoupling of the steering wheel 30 from the steering shaft 44 and the steering gear 32. The steering wheel 30 and the steering column 40 moves from the extended position towards the retracted position, in response to the steering wheel 30 being in a non-rotatable condition.

The sensor assembly 34 is provided with a plurality of sensors that monitor a space within the vehicle compartment 10. The sensor assembly 34 is disposed proximate at least one of the steering wheel 30 and the steering column 40. In at least one embodiment, the sensor assembly 34 is disposed proximate the vehicle instrument panel eyebrow or other position to enable the sensor assembly 34 to monitor the space within the vehicle compartment 10. The sensor assembly 34 monitors various conditions, environments, or obstacles within the vehicle compartment 10 to inhibit or enable the activation or deactivation of the ADAS 22. The sensor assembly 34 includes a first sensor 50, a second sensor 52, and a third sensor 56. The first sensor 50, the second sensor 52, and/or the third sensor 54 or combinations thereof may be disposed in a single housing of the sensor assembly 34.

The first sensor 50 detects a condition of a driver of the vehicle. The first sensor 50 monitors the awareness (e.g. whether the driver is texting, playing a game, reading, holding an object, not wearing a safety belt), drowsiness, the health, or other biometric parameters (e.g. heart rate, breathing, weight scales, eye movement, etc.) of the driver of the vehicle. The condition of the driver of the vehicle is a condition in which the driver of the vehicle is responsive or non-responsive. During certain circumstances a medical emergency or other circumstances may result in a non-responsive driver or an unprepared driver that is unable to resume control of the vehicle in response to a request to deactivate the ADAS 22 and hand over control of the vehicle back to the driver.

The first sensor 50 monitors the condition of the driver of the vehicle while the ADAS 22 is activated. In at least one embodiment, the first sensor 50 monitors a condition of the driver of the vehicle regardless of whether the ADAS 22 is activated or deactivated.

The first sensor 50 provides data or a first signal indicative of the condition of the driver of the vehicle to a monitoring system capable of providing various alerts or warnings to the driver of the vehicle. The first sensor 50 is a biometric sensor, an optical sensor, an optical camera, or the like.

The monitoring system includes the controller 36. The controller 36 may be in communication with the ADAS 22. In at least one embodiment, the controller 36 embodies the ADAS 22. In at least one embodiment, the controller 38 is provided as a separate component from the ADAS 22 and is in communication with the autonomous vehicle, the autonomously driven vehicle, or the selectively autonomous vehicle.

The controller 36 is in communication with the first sensor 50 of the sensor assembly 34. The controller 36 receives the first signal provided by the first sensor 50. A first warning or a driver condition warning is provided to a driver of the vehicle when the first signal indicates a non-responsive driver of the vehicle. The first warning is an audible, visual, tactile, or haptic warning or a warning that is a combination thereof. The first warning is provided by an alert system 60 that is in communication with the first sensor 50 of the sensor assembly 34 and the controller 36.

The second sensor 52 detects a position of the driver of the vehicle. The second sensor 52 monitors whether the driver is within the driver's seat of the vehicle or not within the driver's seat of the vehicle. The second sensor 52 monitors the position of the driver of the vehicle while the ADAS 22 is activated. In at least one embodiment, the second sensor 52 monitors the position of other occupants of the vehicle while the ADAS 22 is activated.

The second sensor 52 provides data or a second signal indicative of the position of the driver of the vehicle to the controller 36. The second sensor 52 is an optical sensor, an optical camera, a weight sensor disposed in the driver's seat, an ultrasonic sensor, a thermal sensor, a capacitive sensor, a ranging detector, an inductive sensor, a sonar device, an infrared detector, a lidar device, a laser device, a radar device, or the like.

The controller 36 is in communication with the second sensor 52 of the sensor assembly 34. The controller 36 receives the second signal provided by the second sensor 52. A second warning or a driver position warning is provided to a driver of the vehicle when the second signal indicates a driver not within the driver's seat. The second warning is an audible, visual, tactile, or haptic warning or a warning that is a combination thereof. In at least one embodiment, the second warning is provided to occupants of the vehicle when the second signal indicates an occupant within a threshold distance from the driver seat in anticipation that the occupant distracts the driver of the vehicle, while the driver of the vehicle is within the driver's seat. The second warning is provided by the alert system 60 that is in communication with the second sensor 52 of the sensor assembly 34 and the controller 36.

The third sensor 54 detects whether an obstacle is proximate or within a path of travel of the steering wheel 30 and the steering column 40. The obstacle may be an object, a person, a device, a pet, or the like that is within the path of travel of the steering wheel 30 and the steering column 40 as the steering wheel 30 and the steering column 40 moves between the retracted position to the extended position. The third sensor 54 monitors obstacles while the ADAS 22 is activated or in response to a request to deactivate the ADAS 22 and hand over control of the vehicle to the driver of the vehicle.

The third sensor 54 provides data or a third signal indicative of the obstacle that is proximate or within a path of travel of the steering wheel 30 and the steering column 40 to the controller 36. The third sensor 54 is an optical sensor, an optical camera, an ultrasonic sensor, a thermal sensor, a capacitive sensor, an inductive sensor, a sonar device, an infrared detector, a laser device, a lidar device, a radar device, or the like.

The controller 36 is in communication with the third sensor 54 of the sensor assembly 34. The controller 36 receives the third signal provided by the third sensor 54. A third warning or an obstacle warning is provided to a driver of the vehicle when the third signal indicates an obstacle proximate or within a path of travel of the steering wheel 30 and the steering column 40. The third warning is an audible, visual, tactile, or haptic warning or a warning that is a combination thereof. The third warning is provided by the alert system 60 that is in communication with the third sensor 54 of the sensor assembly 34 and the controller 36.

The warnings are provided to the driver of the vehicle to alert the driver to correct the detected condition or obstacle. The warnings will continue to be provided until the condition is corrected or the obstacle is removed. The warnings are also provided to alert the driver as to the impending deactivation of the ADAS 22 and to prepare for handover of control of the vehicle to the driver of the vehicle.

Figure 3:
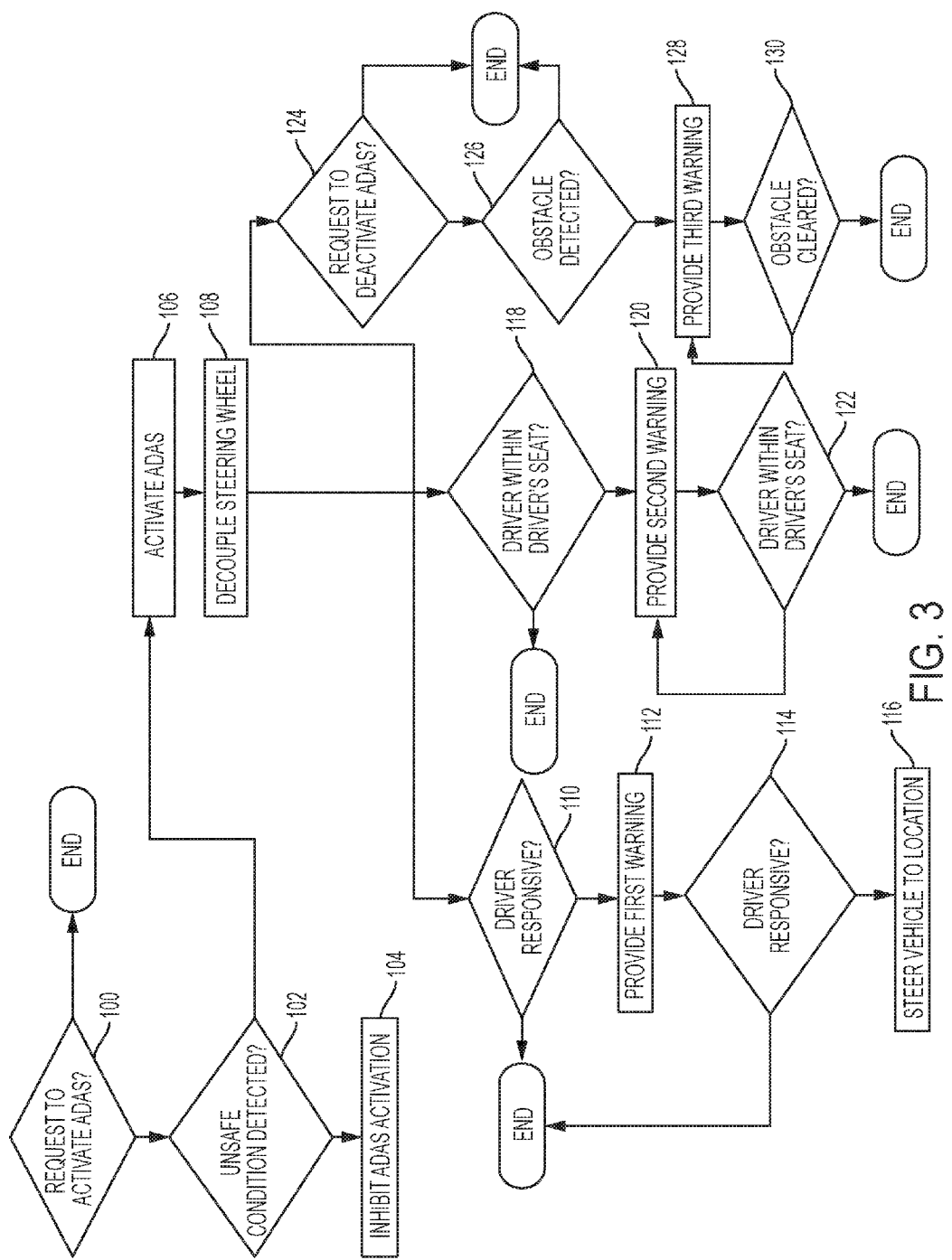
FIG. 3 is a flow diagram illustrating a method of monitoring a space within a vehicle.

Referring to FIG. 3, a flowchart of a method of monitoring a space within a vehicle compartment 10 is shown. As will be appreciated by one of ordinary skill in the art, the flowchart represents control logic that is implemented or affected in hardware, software, or a combination of hardware and software. The various functions are affected by a programmed microprocessor that is incorporated with the controller 36. The control logic is implemented using any of a number of known programming and processing techniques and strategies and is not limited to the order or the sequence illustrated. For instance, interrupt or event driven processing is employed in real-time control applications rather than a purely sequential strategy as illustrated. Likewise, parallel processing, multitasking, or multi-threaded systems and methods may be used.

The control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of monitoring. The illustrated functions may be modified, or in some cases omitted, without departing from the scope intended.

The method may be executed by the controller 36 and may be implemented as a closed loop control system. For brevity, the method will be described in the context of a single method iteration below.

At block 100, the method determines whether a request to activate the ADAS 22 is received. Should a request to activate the ADAS 22 not have been received, the method ends. If a request to activate the ADAS 22 has been received, the method continues to block 102.

At block 102, the method determines whether an unsafe condition is detected by the sensor assembly 34 or a sensor associated with the ADAS 22. The unsafe condition is a condition in which hand over of control to the ADAS 22 is not preferred or an external condition outside of the vehicle that requires driver intervention. If there is an unsafe condition, the method continues to block 104. At block 104 the method inhibits activation of the ADAS 22. Should there not be an unsafe condition detected by the sensor assembly 34 or a sensor associated with the ADAS 22, the method continues to block 106.

At block 106, the method activates the ADAS 22. The ADAS 22 provides directional control of the vehicle without the need for driver input. At block 108, the steering wheel 30 is operatively decoupled from the steering shaft 44 connected to the steering gear 32, in response to activation of the ADAS 22. The steering wheel 30 is switched from a rotatable condition to a non-rotating condition, in response to the operative decoupling of the steering wheel 30 from the steering shaft 44 connected to the steering gear 32. In at least one embodiment, the steering wheel 30 and the steering column 40 are moved from an extended position towards a retracted position, in response to the steering wheel 30 being in a non-rotating condition. As part of the activation of the ADAS 22 the sensor assembly 34 monitors a condition of the driver of the vehicle, a position of the driver of the vehicle, and obstacles proximate a path of travel of the steering wheel 30 and the steering column 40.

At block 110, the method determines whether a driver of the vehicle is responsive. The sensor assembly 34 monitors the condition of the driver of the vehicle and provides a first signal indicative of the condition of the driver of the vehicle to the controller 36. Should the first signal indicate a responsive driver, the method ends. In at least one embodiment, in response to a request to deactivate the ADAS 22 and the first signal indicating a responsive driver, the method deactivates the ADAS 22 and hands over directional control of the vehicle to the driver of the vehicle.

Referring back to block 110, if the first signal indicates a non-responsive driver, the method continues to block 112. At block 112 a first warning is provided to the driver of the vehicle.

At block 114, the method determines whether the driver of the vehicle has responded to the first warning. Should the driver of the vehicle not become responsive in response to the first warning or multiple warnings provided in some embodiments, the method continues to block 116. If the driver of the vehicle is responsive in response to the first warning, the method hands over directional control of the vehicle to the driver of the vehicle in response to a request to deactivate the ADAS 22.

At block 116, the ADAS 22 safely steers the vehicle to a predetermined location such as a hospital, a rest area, the side of the road, or other safe location. In at least one embodiment, the method contacts emergency personnel.

At block 118, the method determines a position of the driver of the vehicle within the vehicle compartment 10. The sensor assembly 34 monitors the position of the driver of the vehicle and provides a second signal indicative of a position of the driver of the vehicle to the controller 36. Should the second signal indicate a driver within the driver's seat, the method ends. In at least one embodiment, in response to a request to deactivate the ADAS 22 and the second signal indicating a driver within the driver's seat, the method deactivates the ADAS 22 and hands over directional control of the vehicle to the driver of the vehicle.

Referring back to block 118, if the second signal indicates a driver not within the driver's seat of the vehicle, the method continues to block 120. At block 120, a second warning is provided to the driver of the vehicle.

At block 122, the method determines whether the driver of the vehicle has responded to the second warning. Should the driver of the vehicle not have returned to the driver's seat of the vehicle, the method returns to block 120 and continues to emit the warning and hand over to the driver of the vehicle is inhibited. If the driver of the vehicle has returned to the driver seat of the vehicle, the method ends and hands over directional control of the vehicle to the driver of the vehicle in response to a request to deactivate the ADAS 22.

At block 124, the method determines whether a request to deactivate the ADAS 22 has been received. Should a request to deactivate the ADAS 22 have not been received, the method ends. If a request to deactivate the ADAS 22 has been received, the method continues to block 126.

At block 126, the method determines whether an obstacle is disposed proximate or within a path of travel of the steering wheel 30 and the steering column 40. Should an obstacle be detected within the path of travel of the steering wheel 30 and the steering column 40, the method deactivates the ADAS 22. The deactivation of the ADAS 22 includes moving the steering wheel 30 and the steering column 40 from the retracted position towards the extended position, coupling the steering wheel 30 to the steering shaft 44 and the steering gear 32, and switching the steering wheel 30 from a non-rotating condition to a rotatable condition.

Returning to block 126, if an obstacle is detected within the path of travel of the steering wheel 30 and the steering column 40, the method continues to block 128. At block 128, a third warning is provided to the driver of the vehicle.

At block 130, the method determines whether the obstacle is no longer within the path of travel of the steering wheel 30 and the steering column 40. Should the obstacle remain within the path of travel of the steering wheel 30 and the steering column 40, the method returns to block 128 and continues to emit the warning and inhibits hand over to the driver of the vehicle. If the obstacle is no longer within or proximate the path of travel of the steering wheel 30 and the steering column 40, the method ends and hands over directional control of the vehicle to the driver of the vehicle.

The monitoring of the space within the vehicle compartment 10 by the sensor assembly 34 enables the driver to be alerted as to a potential handing over of directional control of the vehicle back to the driver from the ADAS 22. Alternatively, when directional control of the vehicle is within the hands of the driver of the vehicle, the sensor assembly 34 enables the ADAS 22 to intervene and take over directional control of the vehicle to guide the vehicle to a predetermined location.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering assembly, comprising:
    a steering wheel connected to a steering column;
    a steering gear selectively coupled to the steering wheel; and
    a sensor assembly disposed proximate the steering column, the steering wheel is decoupled from the steering gear and the sensor assembly detects a condition of a driver and a position of the driver in response to a request to activate an autonomous driving assisted steering system.

2. The steering assembly of claim 1, wherein in response to the request to activate an autonomous driving assisted steering system the steering wheel switches from a rotatable condition to a non-rotatable condition.

3. The steering assembly of claim 1, wherein in response to the steering wheel being operatively decoupled from the steering gear, the steering wheel and the steering column moves from an extended position towards a retracted position.

4. The steering assembly of claim 1, further comprising an alert system in communication with the sensor assembly, the alert system outputs a warning in response to a signal provided by the sensor assembly indicative of at least one of a non-responsive driver and an unprepared driver.

5. The steering assembly of claim 1, wherein the sensor assembly includes at least one of a biometric sensor, an optical sensor, an ultrasonic sensor, a thermal sensor, an optical camera, a capacitive sensor, an inductive sensor, a SONAR device, an infrared detector, a LIDAR device, and a Radar device.

6. A steering assembly, comprising:
    a steering wheel connected to a steering column provided with an autonomous vehicle, the steering wheel selectively coupled to a steering gear and movable between an extended position and a retracted position; and
    a sensor assembly disposed proximate the steering column, the sensor assembly including a first sensor that provides a first signal indicative of a condition of a driver.

7. The steering assembly of claim 6, wherein in response to a request to activate an autonomous driving assisted steering system, the steering wheel is operatively decoupled from the steering gear.

8. The steering assembly of claim 6, wherein a driver condition warning is provided when the first signal indicates a non-responsive driver while an autonomous driving assisted steering system is active.

9. The steering assembly of claim 6, wherein the sensor assembly further includes a second sensor that provides a second signal indicative of a position of the driver.

10. The steering assembly of claim 9, wherein a driver position warning is provided when the second signal indicates a position of a driver not within a driver seat.

11. The steering assembly of claim 6, wherein the sensor assembly further includes a third sensor that provides a third signal indicative of an obstacle proximate a path of travel of the steering wheel.

12. The steering assembly of claim 11, wherein an obstacle warning is provided when the third signal indicates an obstacle proximate the path of travel of the steering wheel, in response to a second request to deactivate an autonomous driving assisted steering system.

13. A method of monitoring a space within an autonomous vehicle, comprising:
    activating an autonomous driving assisted steering system;
    detecting a condition of a driver of a vehicle with a sensor assembly while the autonomous driving assisted steering system is active, the sensor assembly providing a first signal indicative of the condition of the driver; and
providing a first warning to the driver when the first signal indicates a non-responsive driver.

14. The method of claim 13, further comprising steering the vehicle to a predetermined location in response to the first signal indicating the non-responsive driver.

15. The method of claim 13, further comprising detecting a position of the driver with the sensor assembly.

16. The method of claim 15, wherein the sensor assembly provides a second signal indicative of the position of the driver.

17. The method of claim 16, further comprising providing a second warning to the driver when the second signal indicates the position of the driver not within a driver's seat.

18. The method of claim 13, further comprising detecting an obstacle proximate a path of travel of a steering wheel with the sensor assembly in response to a request to deactivate the autonomous driving assisted steering system.

19. The method of claim 18, wherein the sensor assembly provides a third signal indicative of the obstacle proximate the path of travel of the steering wheel.

20. The method of claim 19, further comprising providing a third warning to the driver when the third signal indicates the obstacle proximate the path of travel of the steering wheel.

* * * * *